(12) United States Patent
Ide (10) Patent No.: US 12,337,855 B2
(45) Date of Patent: Jun. 24, 2025

(54) VEHICLE POWER SUPPLY DEVICE AND METHOD FOR CONTROLLING VEHICLE POWER SUPPLY DEVICE

(71) Applicant: HONDA MOTOR CO., LTD., Tokyo (JP)

(72) Inventor: Hirohito Ide, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 670 days.

(21) Appl. No.: 17/506,334

(22) Filed: Oct. 20, 2021

(65) Prior Publication Data

US 2022/0153285 A1 May 19, 2022

(30) Foreign Application Priority Data

Nov. 13, 2020 (JP) ................................. 2020-189755

(51) Int. Cl.
| | |
|---|---|
| B60W 50/029 | (2012.01) |
| B60R 16/023 | (2006.01) |
| B60R 16/033 | (2006.01) |
| B60W 60/00 | (2020.01) |
| H02J 9/06 | (2006.01) |

(52) U.S. Cl.
CPC ....... B60W 50/029 (2013.01); B60R 16/0232 (2013.01); B60R 16/033 (2013.01); B60W 60/001 (2020.02); H02J 9/06 (2013.01)

(58) Field of Classification Search
CPC .............. B60W 50/029; B60W 60/001; B60R 16/0232; B60R 16/033; B60R 16/03; H02J 9/06; H02J 7/34; B62D 6/00; B62D 5/006; B62D 5/0409; B62D 15/025

USPC ........................................................ 701/23
See application file for complete search history.

(56) References Cited

U.S. PATENT DOCUMENTS

| | | | | |
|---|---|---|---|---|
| 9,643,620 | B2* | 5/2017 | Odate | G05D 1/0061 |
| 10,800,411 | B2* | 10/2020 | Kinoshita | B60W 10/18 |
| 11,697,409 | B2* | 7/2023 | Inoue | B60W 30/06 |
| | | | | 701/41 |
| 11,699,917 | B2* | 7/2023 | Kozuki | H02J 9/061 |
| | | | | 307/64 |
| 2010/0082198 | A1* | 4/2010 | Arai | H02J 7/0032 |
| | | | | 701/31.4 |

(Continued)

FOREIGN PATENT DOCUMENTS

| | | |
|---|---|---|
| CN | 102361332 A | 2/2012 |
| CN | 107482761 A | 12/2017 |

(Continued)

OTHER PUBLICATIONS

EP-3616971-A1 machine translation (Year: 2020).*

(Continued)

Primary Examiner — Fadey S. Jabr
Assistant Examiner — Mark Robert Heim
(74) Attorney, Agent, or Firm — Rankin, Hill & Clark LLP (57) ABSTRACT

A vehicle power supply device acquires a state of a vehicle, controls a first switch disposed between an auxiliary power supply and a second load to be in a disconnected state in a case where the vehicle is in a predetermined state including ignition off, and controls the first switch to be in a connected state in a case where the vehicle is in a predetermined automatic driving state among automatic driving states including partial and conditional automatic driving.

8 Claims, 7 Drawing Sheets

(56) References Cited

U.S. PATENT DOCUMENTS

| | | | |
|---|---|---|---|
| 2010/0228417 A1* | 9/2010 | Lee | B62D 15/025 |
| | | | 701/23 |
| 2015/0120124 A1* | 4/2015 | Bartels | B60W 60/0053 |
| | | | 701/23 |
| 2016/0039428 A1* | 2/2016 | Odate | B60W 50/00 |
| | | | 701/23 |
| 2016/0257270 A1* | 9/2016 | Teramoto | B60L 58/20 |
| 2017/0341528 A1* | 11/2017 | Kinoshita | B60L 58/15 |
| 2017/0349048 A1* | 12/2017 | Nakayama | B60L 3/04 |
| 2018/0157256 A1* | 6/2018 | Oniwa | B60W 60/0051 |
| 2018/0370524 A1* | 12/2018 | Kinoshita | B60L 58/20 |
| 2019/0047560 A1* | 2/2019 | Kinoshita | B60W 10/18 |
| 2019/0260225 A1* | 8/2019 | Hida | B60L 50/60 |
| 2019/0337475 A1 | 11/2019 | Kawamura | |
| 2020/0003843 A1* | 1/2020 | Kinoshita | G01R 19/16542 |
| 2020/0216079 A1* | 7/2020 | Mahajan | B60W 60/0051 |
| 2020/0238832 A1* | 7/2020 | Nakayama | B60R 16/033 |
| 2020/0259363 A1* | 8/2020 | Fukae | B60R 16/03 |
| 2020/0298710 A1* | 9/2020 | Masaki | H02M 3/155 |
| 2020/0313457 A1* | 10/2020 | Kozuki | H02J 7/0047 |
| 2021/0024097 A1* | 1/2021 | Jardine | B60W 60/001 |
| 2021/0078572 A1* | 3/2021 | Kim | B60W 30/12 |
| 2021/0094568 A1* | 4/2021 | Nakanishi | B60W 60/005 |
| 2021/0320506 A1* | 10/2021 | Morita | H02J 7/0024 |
| 2022/0024396 A1* | 1/2022 | Rapp | B60R 16/03 |
| 2022/0080956 A1* | 3/2022 | Seeland | B60W 30/06 |
| 2022/0219688 A1* | 7/2022 | Ito | B60W 30/14 |
| 2022/0234607 A1* | 7/2022 | Hata | B60W 60/001 |
| 2022/0281473 A1* | 9/2022 | LaBarbera | B62D 15/025 |
| 2022/0306019 A1* | 9/2022 | Yoshimi | B60R 16/03 |
| 2022/0396291 A1* | 12/2022 | Kerschbaum | B60W 50/14 |
| 2023/0072786 A1* | 3/2023 | Morita | H02J 7/342 |
| 2023/0347926 A1* | 11/2023 | Hayakawa | G08G 1/052 |
| 2024/0034408 A1* | 2/2024 | Suzuki | B62D 15/025 |

FOREIGN PATENT DOCUMENTS

| | | | | |
|---|---|---|---|---|
| CN | 110235328 A | | 9/2019 | |
| CN | 115606069 A | | 1/2023 | |
| DE | 10 2016 103 917 A1 | | 9/2016 | |
| EP | 3616971 A1 | * | 3/2020 | ............... B60L 1/00 |
| EP | 3616974 A1 | * | 3/2020 | ............... B60L 1/00 |
| JP | 2010110192 A | * | 5/2010 | |
| JP | 2016-164015 A | | 9/2016 | |
| JP | 2017-218013 | | 12/2017 | |
| JP | 2019030116 A | * | 2/2019 | |
| JP | 2019-146305 A | | 8/2019 | |
| JP | 2019151272 A | * | 9/2019 | |
| JP | 2020123380 A | * | 8/2020 | |
| JP | 2021-180550 A | | 11/2021 | |
| WO | WO-2017191818 A1 | * | 11/2017 | ............. B60R 16/03 |
| WO | WO-2018211033 A1 | * | 11/2018 | |

OTHER PUBLICATIONS

EP-3616974-A1 machine translation (Year: 2020).*
JP-2010110192-A machine translation (Year: 2010).*
JP-2019030116-A machine translation (Year: 2019).*
JP-2019151272-A machine translation (Year: 2019).*
JP-2020123380-A machine translation (Year: 2020).*
WO-2017191818-A1 machine translation (Year: 2017).*
WO-2018211033-A1 machine translation (Year: 2018).*
Chinese Office Action dated Dec. 14, 2023, Chinese Application No. 202111337590.A, English translation included, 16 pages.
Japanese Office Action dated Oct. 3, 2023, Japanese Application No. JP 2020-189755, English translation included, 9 pages.

* cited by examiner

| STATE OF VEHICLE | | FIRST SWITCH |
|---|---|---|
| IGNITION | DRIVING MODE | |
| IG-ON | AUTOMATIC DRIVING | ON |
| | NORMAL DRIVING | OFF |
| IG-OFF | — | OFF |

FIG.3

| STATE OF VEHICLE | | FIRST SWITCH |
|---|---|---|
| IGNITION | DRIVING MODE | |
| IG-ON | HANDS-OFF AUTOMATIC DRIVING | ON |
| | HANDS-ON AUTOMATIC DRIVING | OFF |
| | NORMAL DRIVING | OFF |
| IG-OFF | — | OFF |

FIG.4

| STATE OF VEHICLE | | STATE OF DRIVER | FIRST SWITCH |
|---|---|---|---|
| IGNITION | DRIVING MODE | | |
| IG-ON | AUTOMATIC DRIVING | HANDS-OFF | ON |
| | | HANDS-ON | OFF |
| | NORMAL DRIVING | ---- | OFF |
| IG-OFF | ---- | ---- | OFF |

FIG.5

| STATE OF VEHICLE | | STATE OF DRIVER | FIRST SWITCH |
|---|---|---|---|
| IGNITION | DRIVING MODE | | |
| IG-ON | HANDS-OFF AUTOMATIC DRIVING | HANDS-OFF | ON |
| | | HANDS-ON | OFF |
| | HANDS-ON AUTOMATIC DRIVING | — | OFF |
| | NORMAL DRIVING | — | OFF |
| IG-OFF | — | — | OFF |

VEHICLE POWER SUPPLY DEVICE AND METHOD FOR CONTROLLING VEHICLE POWER SUPPLY DEVICE

INCORPORATION BY REFERENCE

The present application claims priority under 35 U.S.C. § 119 to Japanese Patent Application No. 2020-189755 filed on Nov. 13, 2020. The content of the application is incorporated herein by reference in its entirety.

BACKGROUND OF THE INVENTION

Technical Field

The present invention relates to a vehicle power supply device and a method for controlling a vehicle power supply device.

Related Art

There is known a vehicle equipped with an advanced driving assistance system including an adaptive cruise control (ACC) system, a lane keep assist (LKA) system, an automatic brake system, and the like, and an automatic driving system, and the like, and provided with a plurality of power supplies including a storage battery for loads such as an electric brake and an electric power steering (for example, see JP 2017-218013 A). In the technique described in JP 2017-218013 A, by supplying power of an auxiliary power supply to a first path connected to a main power supply, in a case where an abnormality occurs in the main power supply, an electric load related to travel control for realizing advanced driving assistance can be operated by power from the auxiliary power supply.

SUMMARY

In recent years, electrification of vehicles has progressed due to adoption of automatic driving, and capacities of both main power supplies and auxiliary power supplies have increased. However, an increase in capacities of power supplies leads to an increase in component spaces and an increase in weight of vehicle, which is disadvantageous for improvement in energy consumption efficiency. As one of solutions to this disadvantage, a reduction in capacities of auxiliary power supplies is desired.

On the other hand, when a capacity of an auxiliary power supply is reduced, it is necessary to consider a decrease in charge amounts due to an influence of dark current or the like at a time of ignition off, and frequencies of charging and discharging increase, which is disadvantageous for improving life of the auxiliary power supply.

The present invention has been made in view of such a background, and an object of the present invention is to more easily achieve both a capacity reduction and an improvement in life of an auxiliary power supply.

Solution to Problem

A first aspect for achieving the above object is a vehicle power supply device including: a main power supply; a first load that is connected to the main power supply; a second load that is connected in parallel with the first load, is connected to the main power supply, and has a function related to at least either one of traveling and stopping of a vehicle; and an auxiliary power supply that is connected to the second load and is connected in parallel with the main power supply, wherein the vehicle power supply device further includes a first switch that is disposed between the auxiliary power supply and the second load, and a control device that controls the first switch, the control device has a function of acquiring a state of the vehicle, controls the first switch to be in a disconnected state in a case where the vehicle is in a predetermined state including ignition off, and controls the first switch to be in a connected state in a case where the vehicle is in a predetermined automatic driving state including a state of a hands-off automatic driving mode that allows hands-off driving among automatic driving states including partial and conditional automatic driving.

In addition, a second aspect is a vehicle power supply device including: a main power supply; a first load that is connected to the main power supply and has a function related to at least either one of traveling and stopping of a vehicle; a second load that is connected in parallel with the first load, is connected to the main power supply, and has a function related to at least either one of traveling and stopping of the vehicle; and an auxiliary power supply that is connected to the second load and is connected in parallel with the main power supply, wherein the vehicle power supply device further includes a first switch that is disposed between the auxiliary power supply and the second load, and a control device that controls the first switch, the control device has a function of acquiring a state of the vehicle, controls the first switch to be in a disconnected state in a case where the vehicle is in a predetermined state including ignition off, and controls the first switch to be in a connected state in a case where the vehicle is in a predetermined automatic driving state among automatic driving states including partial and conditional automatic driving.

In the vehicle power supply device, the predetermined automatic driving state may include a state of a hands-off automatic driving mode that allows hands-off driving among partial and conditional automatic driving.

In the vehicle power supply device, the control device may have a function of detecting whether hands of an occupant of the vehicle are off a handle of the vehicle, and in a case of predetermined automatic driving among partial and conditional automatic driving, the control device may control the first switch to be in a connected state when the hands of the occupant are off the handle, and may control the first switch to be in a disconnected state when the hands of the occupant are not off the handle.

In the vehicle power supply device, the control device may specify, based on a detection result of a contact sensor that detects contact of hands with the handle of the vehicle, whether the hands of the occupant are off the handle.

In the vehicle power supply device, the control device may specify, based on a detection result of a reaction force sensor that detects a reaction force to the handle of the vehicle, whether the hands of the occupant are off the handle.

In the vehicle power supply device, the control device may specify, based on an image capturing result of an image capturing unit that captures an occupant of the vehicle, whether the hands of the occupant are off the handle.

In the vehicle power supply device, the main power supply may be connected to a second power supply capable of outputting a voltage higher than a voltage of the main power supply, the auxiliary power supply may be connected to the second power supply via a connection line from the main power supply to the second load, and, in a case where the vehicle is in a predetermined automatic driving state among automatic driving states including partial and conditional automatic driving, the control device may control the second power supply such that a voltage of a connection line from a main power supply side including at least the main power supply and the second power supply to the second load exceeds a voltage of the auxiliary power supply.

The vehicle power supply device may include a second switch that is disposed between the main power supply and the auxiliary power supply, wherein the main power supply may be connected to a second power supply capable of outputting a voltage higher than a voltage of the main power supply, the auxiliary power supply may be connected to the second power supply via the second switch, and, in a case where an abnormality occurs on the main power supply side rather than the second switch, the control device may control the second switch to be in a disconnected state and may control the first switch to be in a connected state regardless of whether the vehicle is in an automatic driving state.

In the vehicle power supply device, in a case where no abnormality occurs on the main power supply side rather than the second switch, the control device may permit switching of the first switch to a connected state in a case where a voltage of a connection line from the main power supply side to the second load exceeds a voltage of the auxiliary power supply, and may prohibit the switching of the first switch to a connected state in a case where the voltage of the connection line from the main power supply side to the second load does not exceed the voltage of the auxiliary power supply.

A third aspect for achieving the above object is a method for controlling a vehicle power supply device including: a main power supply; a first load that is connected to the main power supply; a second load that is connected in parallel with the first load, is connected to the main power supply, and has a function related to at least either one of traveling and stopping of a vehicle; and an auxiliary power supply that is connected to the second load and is connected in parallel with the main power supply, the method including: acquiring a state of the vehicle; controlling a first switch disposed between the auxiliary power supply and the second load to be in a disconnected state in a case where the vehicle is in a predetermined state including ignition off; and controlling the first switch to be in a connected state in a case where the vehicle is in a predetermined automatic driving state including a state of a hands-off automatic driving mode that allows hands-off driving among automatic driving states including partial and conditional automatic driving.

A fourth aspect for achieving the above object is a method for controlling a vehicle power supply device including: a main power supply; a first load that is connected to the main power supply; a second load that is connected in parallel with the first load, is connected to the main power supply, and has a function related to at least either one of traveling and stopping of a vehicle; an auxiliary power supply that is connected to the second load and is connected in parallel with the main power supply; a first switch that is disposed between the auxiliary power supply and the second load; a second switch that is disposed between the main power supply and the auxiliary power supply; and a control device that controls the first switch and the second switch, wherein the main power supply is connected to a second power supply capable of outputting a voltage higher than a voltage of the main power supply, and the auxiliary power supply is connected to the second power supply via the second switch, the method performed by the control device, including: acquiring a state of the vehicle, controlling the first switch to be in a disconnected state in a case where the vehicle is in a predetermined state including ignition off, and controlling the first switch to be in a connected state in a case where the vehicle is in a predetermined automatic driving state among automatic driving states including partial and conditional automatic driving; controlling the second switch to be in a disconnected state in a case where an abnormality occurs on the main power supply side rather than the second switch, and controlling the first switch to be in a connected state regardless of whether the vehicle is in an automatic driving state; and controlling the second switch to be in a connected state in a case where no abnormality occurs on the main power supply side rather than the second switch, and controlling the second power supply to output a voltage higher than a voltage of the main power supply and a voltage at which the voltage of the connection line from the main power supply side to the second load exceeds the voltage of the auxiliary power supply in a case where the vehicle is in a predetermined automatic driving state among automatic driving states including partial and conditional automatic driving and in a case where the voltage of the connection line from the main power supply side to the second load does not exceed the voltage of the auxiliary power supply.

According to the present invention, it is easier to achieve both a capacity reduction and an improvement in life of an auxiliary power supply.

DETAILED DESCRIPTION

Hereinafter, an embodiment of the present invention will be described with reference to the drawings.

Figure 1:
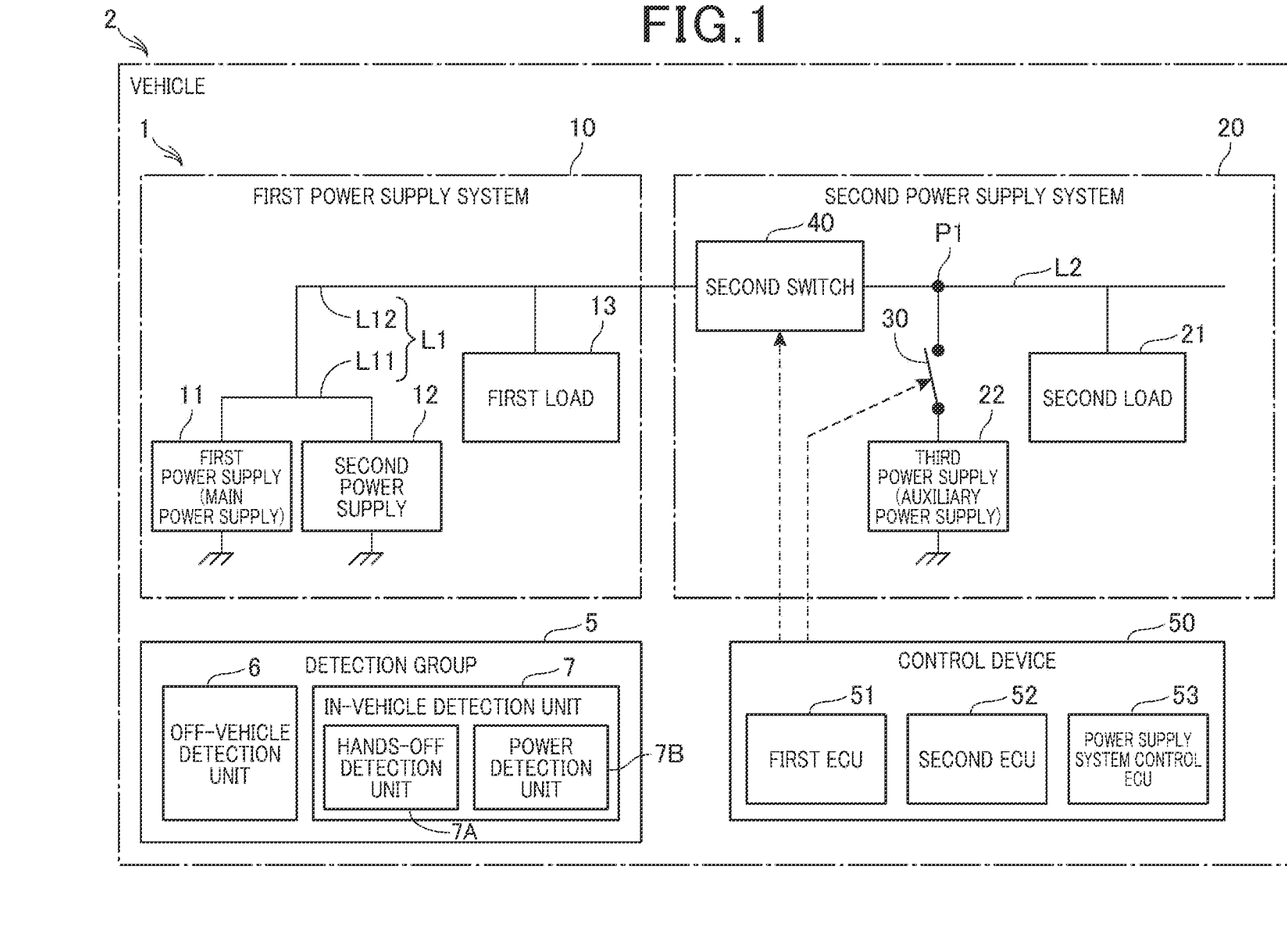
FIG. 1 is a diagram illustrating a configuration of a vehicle power supply device according to an embodiment of the present invention.

FIG. 1 is a diagram illustrating a configuration of a vehicle power supply device according to the embodiment of the present invention.

A vehicle power supply device 1 is mounted on a vehicle 2 equipped with an advanced driving assistance system (also referred to as an automatic driving system), and supplies power to each part of the vehicle 2. An advanced driving system is a system that enables at least automatic driving. The automatic driving of the present invention is not limited to what is called automatic driving at level 4 or higher in a narrow sense, and includes partial and conditional automatic driving included at at least levels 2 and 3. In the present invention, a function of performing automatic driving at level 4 or higher is not essential.

For example, the vehicle 2 according to the present embodiment has a function of performing driving assistance such as Parking Assist (automatic parking), lane keeping assist function (LKAS), lane change assistance, and adaptive cruise control (ACC) as partial automatic driving, and has a function of applying ProPILOT or the like in which all operations are automated under certain conditions as conditional automatic driving. In the following description, a case where the vehicle 2 does not have a function of performing "advanced automation" and "complete automation" at Level 4 or higher will be described as an example.

In the present embodiment, it is assumed that a driver (occupant) is obliged to monitor surroundings for automatic driving at up to level 2, and the vehicle 2 (advanced driving assistance system) is obliged to monitor surroundings for automatic driving at level 3 or higher. Further, in automatic driving at up to level 3, in a case where an abnormality occurs in the advanced driving assistance system, a driver can back up driving for stopping the vehicle 2.

The vehicle 2 is an electric vehicle that drives, with power, a drive system related to a traveling system such as a brake, a power steering, and a power unit. For example, the vehicle 2 is an electric vehicle, a hybrid electrical vehicle (HEV), and a fuel cell vehicle (FCV). Note that the vehicle 2 may not be limited to an electric vehicle, and may be a vehicle having an electric brake and an electric power steering and having an internal combustion engine as a power unit.

FIG. 1 illustrates an example of a detection group 5 included in the vehicle 2. The detection group 5 is a group of various detection devices. The detection group 5 includes an off-vehicle detection unit 6 that detects a surrounding situation of the vehicle 2 and an in-vehicle detection unit 7 that detects a situation of each unit in a vehicle. The off-vehicle detection unit 6 is a device mainly used for automatic driving, and includes, for example, a camera that photographs front, rear, left, and right of a vehicle, and a LIDAR (laser radar: Laser Imaging Detection and Ranging) for measuring a distance to a surrounding object.

The in-vehicle detection unit 7 is a device used for various purposes, and includes an input interface for inputting various instructions (including on/off of an ignition) of an occupant (including a driver), a camera for photographing inside of a vehicle (for example, a driver monitoring camera (DMC)), a sensor for detecting a state of each unit of the vehicle 2, and the like. The sensor that detects the situation of each unit of the vehicle 2 includes a hands-off detection unit 7A and a power detection unit 7B.

The hands-off detection unit 7A is a sensor or the like that detects whether hands of a driver of the vehicle 2 are off a handle (also referred to as a steering wheel) of the vehicle 2. For example, the hands-off detection unit 7A includes at least any of a contact sensor that detects contact of hands with a handle, a reaction force sensor that detects a reaction force to a handle, or an in-vehicle camera that captures an occupant (including a driver) of the vehicle 2.

Then, in a case where the contact sensor does not detect contact of hands with a handle, in a case where the reaction force sensor does not detect a reaction force to the handle in an amount equal to or greater than a specified value, or in a case where an in-vehicle camera has captured a captured image in which it can be considered that a driver is not holding the handle, it is determined by a vehicle ECU (a first ECU 51, a second ECU 52, or the like to be described later) that the driver is in a state where his/her hands are off the handle, that is, a hands-off state.

Conversely, in a case where the contact sensor detects contact of hands with a handle, in a case where the reaction force sensor detects a reaction force to the handle in an amount equal to or greater than a specified value, or in a case where the in-vehicle camera has captured a captured image in which it can be considered that a driver is holding the handle, it is determined by the vehicle ECU that the driver is in a state of holding the handle, that is, in a hands-on state.

The power detection unit 7B can detect a voltage of a power supply (power supplies 11, 12, 22, and the like to be described later) of the vehicle 2 related to the vehicle power supply device 1, and a voltage and a current of each unit of a power supply circuit (circuits of a first and a second power supply systems 10 and 20, and the like) of the vehicle 2.

Known hardware and software can be widely applied to each component of the detection group 5. The vehicle power supply device 1 may include the hands-off detection unit 7A, the power detection unit 7B, and the like.

As illustrated in FIG. 1, the vehicle power supply device 1 includes the first power supply system 10, the second power supply system 20, a first switch 30, a second switch 40, and a control device 50.

The first power supply system 10 includes the first power supply 11, the second power supply 12, and a first load 13. The first power supply 11 is used as a main power supply of the vehicle 2, and includes, for example, a secondary battery having the largest capacity in the vehicle 2. For example, the first power supply 11 includes a lead battery having a large capacity. A secondary battery other than a lead battery may be adopted as the first power supply 11.

The second power supply 12 includes a power converter such as a DC-DC converter, and converts power generated by a generator (for example, an AC generator) into DC power of a predetermined voltage to output. This second power supply 12 can output a voltage V2 higher than a voltage V1 of the first power supply 11. Power of the second power supply 12 can be used for charging the first power supply 11 and the like, driving each unit of the vehicle 2, and the like.

The first load 13 includes a load having a function related to at least either one of traveling and stopping of the vehicle 2. For example, the first load 13 includes a load for operating at least any one of an electric brake, an electric power steering, and predetermined components for automatic driving of the vehicle 2 (for example, a camera or a LIDAR in the off-vehicle detection unit 6).

For example, the first load 13 includes a first brake control device that operates an electric brake of the vehicle 2. In a case where the vehicle 2 includes a starter motor, the first load 13 includes the starter motor.

FIG. 1 schematically illustrates circuit configurations of the first power supply system 10 and the second power supply system 20. The first power supply 11 and the second power supply 12 are electrically connected via a connection line L11. The connection line L11 is electrically connected to the first load 13 via a connection line L12. The connection lines L11 and L12 will be collectively referred to as a "first connection line L1". That is, the first connection line L1 is a power line that connects each of the power supplies 11 and 12 of the first power supply system 10 and the first load 13.

When a voltage of the first power supply 11 decreases, the first power supply 11 is charged by the second power supply 12. In addition, in a case where the second power supply 12 is generating power, the first load 13 can be driven by the second power supply 12, and in a case where the second power supply 12 is not generating power, the first load 13 can be driven by the first power supply 11. Therefore, a driver of the vehicle 2 can perform, by the power of each of the power supplies 11 and 12 of the first power supply system 10, at least any of functions of traveling and stopping of the vehicle 2 carried by the first load 13.

The first load 13 may include a load having a function related to normal driving of the vehicle 2. Normal driving of the vehicle 2 is driving excluding automatic driving of the vehicle 2. A load having the function related to normal driving in the first load 13 is, for example, a load corresponding to a function not related to traveling or stopping of the vehicle 2 or an unessential function among functions related to traveling or stopping of the vehicle 2.

The load having the function related to normal driving of the vehicle 2 is also referred to as an "unimportant load", and a load having an essential function related to traveling or stopping of the vehicle 2 is also referred to as an "important load".

As illustrated in FIG. 1, the second power supply system 20 includes a second load 21 and a third power supply 22.

The second power supply system 20 includes a second connection line L2 that electrically connects the second load 21 and the third power supply 22, and the second connection line L2 is electrically connected to the first connection line L1 of the first power supply system 10 via the second switch 40. That is, the second connection line L2 is a power supply line that supplies power from the first power supply system 10 and the third power supply 22 to the second load 21.

The second load 21 includes a load having the function related to at least either one of traveling and stopping of the vehicle 2. For example, the second load 21 includes a second brake control device that operates an electric brake, and an assist motor and an electric power steering (EPS) control device that operates an electric power steering.

That is, in the vehicle 2, each of the first load 13 and the second load 21 includes the function related to at least either one of traveling and stopping. Therefore, even in a case where the first load 13 does not normally operate due to a power supply abnormality of the first power supply system 10, the second load 21 can decelerate the vehicle 2 or change a traveling direction of the vehicle 2 by power supply from the power supply 22 of the second power supply system 20.

In this case, by designing to continue driving for about several seconds required for a driver to substantially stop the vehicle 2 at a side of a road with power supply from the third power supply 22, it is easier for a driver to substantially stop the vehicle 2 at a side of a road in a case where a power supply abnormality of the first power supply system 10 occurs.

In addition, by including, in the second load 21, an appropriate device such as the camera included in the off-vehicle detection unit 6 and the in-vehicle detection unit 7, the camera and the like included in the off-vehicle detection unit 6 and the in-vehicle detection unit 7 can be used even in a case where a power supply abnormality occurs in the first power supply system 10.

The second switch 40 is a circuit breaker that disconnects the second power supply system 20 from the first power supply system 10 at an abnormal time or the like of the first power supply system 10 The second switch 40 is controlled to be turned on (connected state/off (disconnected state)) by the control device 50.

The third power supply 22 is a power supply of the second power supply system 20 and is an auxiliary power supply of the vehicle 2. The third power supply 22 includes a lithium ion secondary battery having a lower capacity than the first power supply 11. Note that a secondary battery other than the lithium ion battery may be adopted as the third power supply 22 within a range in which performance capable of appropriately operating the second load 21 can be secured. In the following description, the third power supply 22 will be referred to as "auxiliary power supply 22", and the first power supply 11 will be referred to as "main power supply 11".

The auxiliary power supply 22 is connected to the second connection line L2 via the first switch 30. More specifically, the auxiliary power supply 22 is electrically connected between the second load 21 and the second switch 40 via the first switch 30, is connected to the second load 21, and is connected in parallel with the main power supply 11.

Therefore, in a case where the first switch 30 is on, power of the auxiliary power supply 22 is supplied to the second load 21. As a result, in a case where a power supply abnormality or the like of the first power supply system 10 occurs and the vehicle 2 cannot be stopped or the like by the first load 13, the vehicle 2 can be stopped by the second load 21 or a traveling direction can be changed by the auxiliary power supply 22.

The control device 50 has a plurality of electronic control units (ECUs) including a processor and a peripheral circuit, and functions as a computer that centrally controls each unit of the vehicle 2 including the vehicle power supply device 1.

FIG. 1 illustrates the first ECU 51 for controlling the first load 13, the second ECU 52 for controlling the second load 21, and a power supply system control ECU 53 for controlling the first and the second switches 30 and 40. However, the ECUs included in the control device 50 are not limited to the above-described ECUs. Each ECU may include an ECU not related to the vehicle power supply device 1, or may include an ECU provided exclusively for the vehicle power supply device 1.

These ECUs, loads (including the loads 13 and 21) provided in the vehicle 2, the detection group 5, and the first and the second switches 30 and 40 are electrically connected via a communication line or the like, thereby forming an advanced driving assistance system. For example, the control device 50 illustrated in FIG. 1 is a collective control system of an advanced driving assistance system.

The control device 50 has, by using the advanced driving assistance system, a control function of controlling each of the loads 13 and 21 of the vehicle 2, a detection function of detecting a state of each unit of the vehicle 2 (including a voltage and a current in each of the power supply systems 10 and 20 illustrated in FIG. 1), a driving control function of controlling normal driving and automatic driving of the vehicle 2, a function of acquiring a driving state of the vehicle 2, a power supply system control function of controlling predetermined members (the first and the second switches 30 and 40, and the second power supply 12) of a power supply system, and the like.

The power supply system control function of the control device 50 includes a function of controlling a generated voltage of at least either a generator or a DC-DC converter to vary the voltage V2 of the second power supply 12.

Next, control of the first switch 30 will be described.

The control device 50 acquires information that can specify on/off of the ignition of the vehicle 2 via the detection group 5, acquires information that can specify a driving mode of the vehicle 2, and controls on/off of the first switch 30 based on each acquired information.

Figure 2:
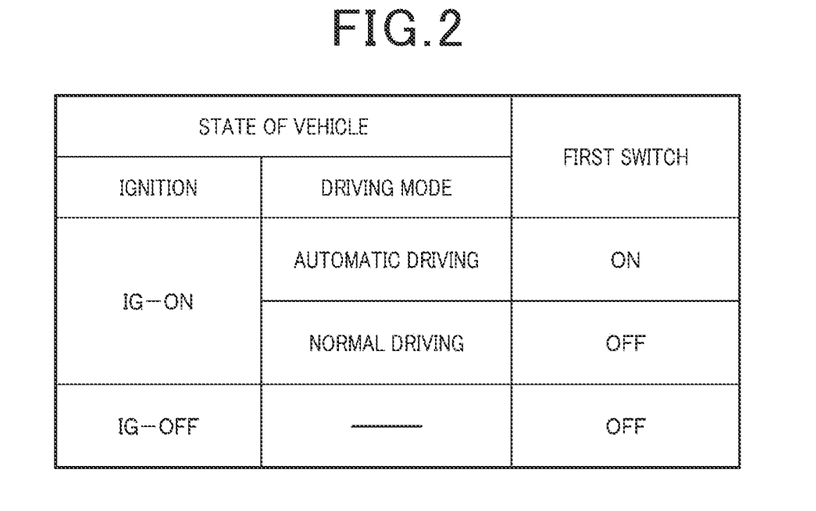
FIG. 2 is a diagram illustrating a relationship between a state of a vehicle and on/off of a first switch.

FIG. 2 is a diagram illustrating a relationship between a state of the vehicle 2 and on/off of the first switch 30.

As illustrated in FIG. 2, when the ignition is on (in FIG. 2, "IG-ON") and a driving mode is switched to automatic driving, the control device 50 switches the first switch 30 to on. Thus, the first switch 30 is held on while the vehicle 2 is traveling with partial and conditional automatic driving. As a result, even in a case where a power supply abnormality occurs in the first power supply system 10, a driver of the vehicle 2 can drive the vehicle 2 by the auxiliary power supply 22. In a case where a power supply of the first power supply system 10 is normal, the auxiliary power supply 22 can be charged by the power supply of the first power supply system 10.

On the other hand, when the ignition is on (in FIG. 2, "IG-ON") and the driving mode is switched to normal driving, the control device 50 switches the first switch 30 to off. The driving mode of normal driving is a driving mode other than automatic driving. As a result, in the case of the driving mode other than automatic driving, the first switch 30 is held off, and a decrease in a charge amount of the auxiliary power supply 22 is avoided.

If the first switch 30 is switched to on when the driving mode is normal driving, power of the auxiliary power supply 22 may be consumed in a case where on/off or the like of power generation of the second power supply 12 is actively controlled for the purpose of improving fuel efficiency. Therefore, frequencies of charging and discharging of the auxiliary power supply 22 increase, which is disadvantageous for improving the life of the auxiliary power supply 22.

On the other hand, in the present configuration, since the first switch 30 is controlled to be turned off when the driving mode is normal driving, even if the capacity of the auxiliary power supply 22 is reduced, a decrease in the charge amount of the auxiliary power supply 22 can be suppressed, which is also advantageous for improving the life of the auxiliary power supply 22.

When the ignition is switched to off (in FIG. 2, "IG-OFF"), the control device 50 switches the first switch 30 to off. As a result, the first switch 30 is held off when the ignition is off and, thus, it is possible to avoid a situation in which the charge amount of the auxiliary power supply 22 decreases due to an influence of dark current or the like, which is also advantageous for improving the life of the auxiliary power supply 22.

By the control of the first switch 30 described above, it is easier to achieve both the capacity reduction and the improvement in life of the auxiliary power supply 22 while enabling at least either one of traveling and stopping by using the auxiliary power supply 22 in partial and conditional automatic driving states.

In FIG. 2, the case where the first switch 30 is controlled to be turned on in the case where the ignition is on and the driving mode is automatic driving has been described, but the present invention is not limited thereto. Hereinafter, another control pattern of the first switch 30 will be exemplified. Which control pattern is adopted may be selectable by an occupant such as a driver.

<Another Control Pattern 1 of First Switch 30>

Figure 3:
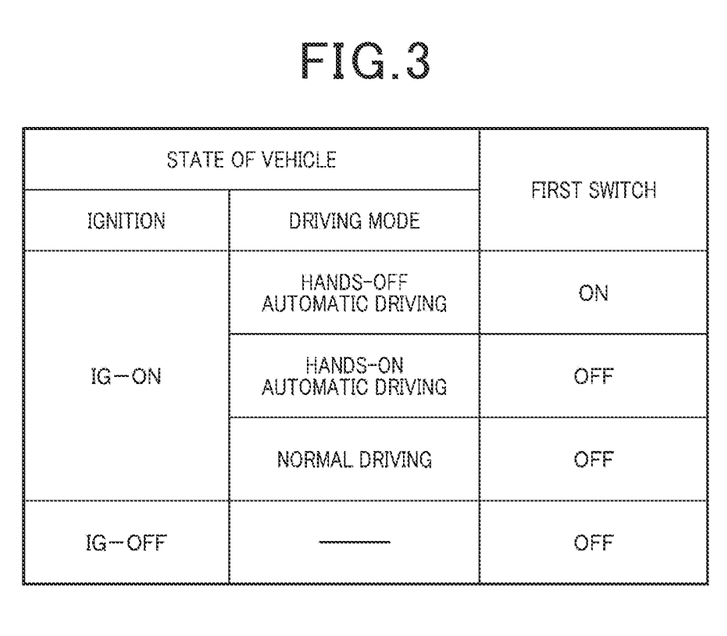
FIG. 3 is a diagram illustrating another control pattern 1 of a first switch.

FIG. 3 is a diagram illustrating another control pattern 1 of the first switch 30.

Automatic driving includes a hands-on automatic driving mode in which automatic driving is performed in a state where a driver holds a handle (hands-on) and a hands-off automatic driving mode in which driving is allowed in a state where hands of the driver are off the handle (referred to as hands-off).

For example, some vehicles 2 include, as the hands-on automatic driving mode, with respect to driving assistance of the lane keeping assist function (LKAS), a hands-on LKAS mode that is executed in a hands-on state at an arbitrary speed and on an arbitrary road. Some vehicles 2 also include, as the hands-off automatic driving mode, a hands-off LKAS mode that is executed in a hands-off state only at a designated speed range and on an automobile exclusive road.

As illustrated in FIG. 3, when the ignition is on (IG-ON) to switch to the hands-off automatic driving mode (for example, the hands-off LKAS mode), the control device 50 switches the first switch 30 to on. Therefore, the first switch 30 is held on while the vehicle 2 travels in the hands-off automatic driving mode among partial and conditional automatic driving. As a result, in a case where an abnormality occurs in the first power supply system 10, a driver can drive to stop the vehicle 2.

On the other hand, when the ignition is on (IG-ON) to switch to the hands-on automatic driving mode (for example, the hands-on LKAS mode), the control device 50 switches the first switch 30 to off. Further, in a case where the ignition is on (IG-ON) to switch to the normal driving mode, or even in a case where the ignition is switched to off (IG-OFF), the control device 50 switches the first switch 30 to off.

As described above, in a case where the ignition is on (IG-ON), except in the case of the hands-off automatic driving mode, the first switch 30 is controlled to be turned off. Therefore, it is easier to achieve both the capacity reduction and the improvement in life of the auxiliary power supply 22 while enabling at least either one of traveling and stopping by using the auxiliary power supply 22 during the hands-off automatic driving.

<Another Control Pattern 2 of First Switch 30>

Figure 4:
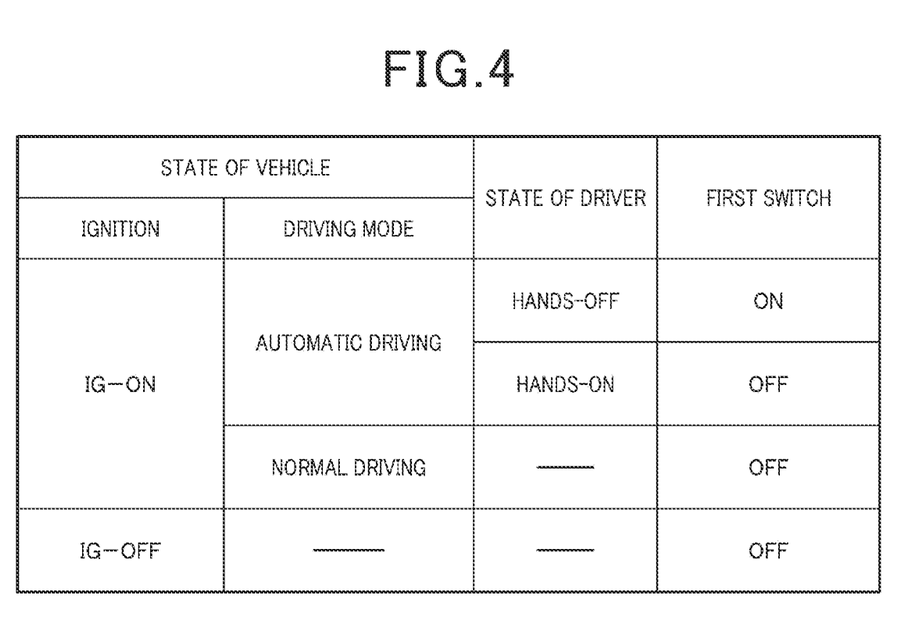
FIG. 4 is a diagram illustrating another control pattern 2 of a first switch.

FIG. 4 is a diagram illustrating another control pattern 2 of the first switch 30.

In FIG. 4, the control device 50 uses the hands-off detection unit 7A to detect whether a driver is in a hands-off state where his/her hands are off a handle of the vehicle 2, or in a hands-on state where his/her hands are not off the handle.

As illustrated in FIG. 4, in a case where the ignition is on (IG-ON) to switch to the automatic driving mode and in a case where a driver is in the hands-off state, the control device 50 switches the first switch 30 to on. Therefore, the first switch 30 is held in a connected state while the vehicle 2 is in the automatic driving mode among partial and conditional automatic driving and a driver is in the hands-off state. As a result, in a case where an abnormality occurs in the first power supply system 10, a driver can drive to stop the vehicle 2 or the like.

On the other hand, in a case where the ignition is on (IG-ON), the automatic driving mode is set, and a driver is in the hands-on state, the control device 50 switches the first switch 30 to off. Further, in a case where the ignition is on (IG-ON) to switch to the normal driving mode, or even in a case where the ignition is switched to off (IG-OFF), the control device 50 switches the first switch 30 to off.

In this manner, except in a case where the ignition is on (IG-ON), the automatic driving mode is set, and a driver is in the hands-off state, the first switch 30 is controlled to be in a disconnected state. This makes it easier to suppress a decrease in the charge amount of the auxiliary power supply 22 as compared with the other control pattern 1.

<Another Control Pattern 3 of First Switch 30>

Figure 5:
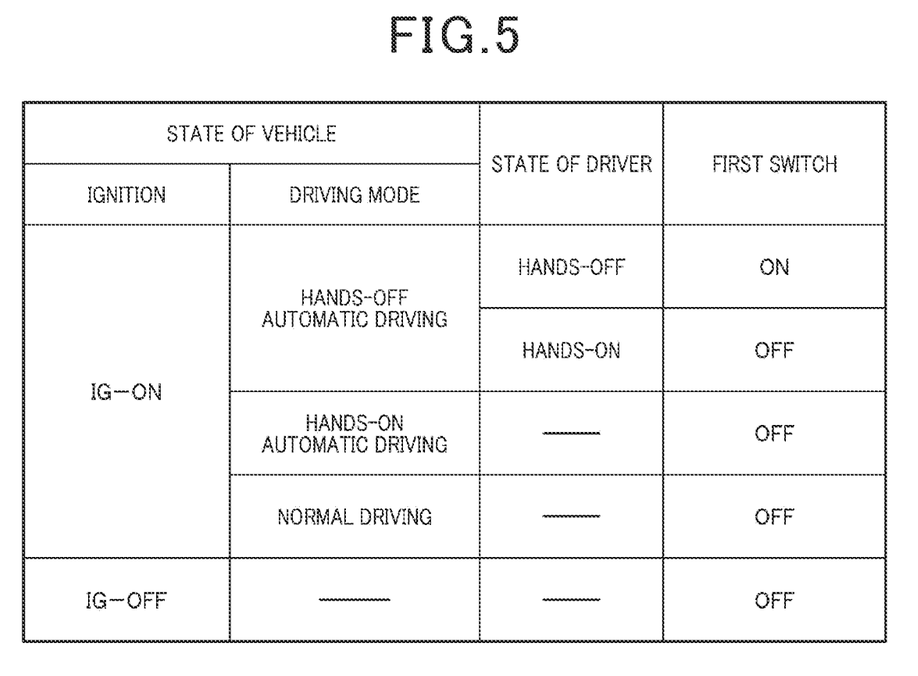
FIG. 5 is a diagram illustrating another control pattern 3 of a first switch.

FIG. 5 is a diagram illustrating another control pattern 3 of the first switch 30.

As illustrated in FIG. 5, in a case where the ignition is turned on (IG-ON), the hands-off automatic driving mode is set, and a driver is in the hands-off state, the control device 50 switches the first switch 30 to on.

On the other hand, in a case where the ignition is on (IG-ON), the hands-off automatic driving mode is set, and a driver is in the hands-on state, the control device 50 switches the first switch 30 to off. In a case where the ignition is on (IG-ON) and the hands-on automatic driving mode is set, in a case where the driving mode is switched to normal driving or even in a case where the ignition is switched off (IG-OFF), the control device 50 switches the first switch 30 to off. This makes it easier to suppress a decrease in the charge amount of the auxiliary power supply 22 as compared with the other control patterns 1 and 2.

Figure 6:
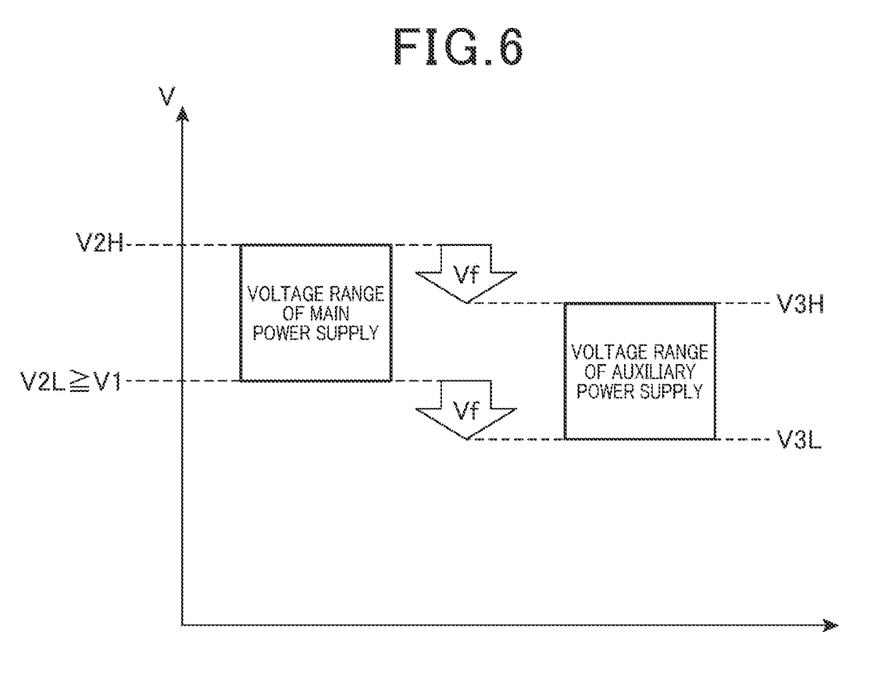
FIG. 6 is a diagram illustrating a relationship between a voltage V2 of a second power supply and a voltage V3 of an auxiliary power supply.

FIG. 6 is a diagram illustrating a relationship between the voltage V2 of the second power supply 12 and a voltage V3 of the auxiliary power supply 22. In FIG. 6, a vertical axis represents voltage. The voltage V2 generated by the second power supply 12 varies in a range from a normal-time maximum value V2H to a normal-time minimum value V2L. The normal-time minimum value V2L is equal to or greater than the voltage V1 of the main power supply 11.

The voltage V3 is a voltage of the auxiliary power supply 22 acting on the second connection line L2 from the auxiliary power supply 22 (for example, a voltage acting on a point P1 in FIG. 1), and varies in a range from a normal-time maximum value V3H to a normal-time minimum value V3L. In FIG. 6, a sign Vf indicates a voltage drop between the second power supply 12 and the second connection line L2 (for example, point P1), and mainly indicates a voltage drop by the second switch 40.

By setting the generated voltage V2 of the second power supply 12 to a voltage higher than the voltage of the auxiliary power supply 22 in this manner, unless an abnormality occurs in the second power supply 12 or the like, power can be supplied from the second power supply 12 to each of the loads 13 and 21, and the frequencies of charging and discharging of the auxiliary power supply 22 can be reduced.

Next, control of the second switch 40 will be described.

Figure 7:
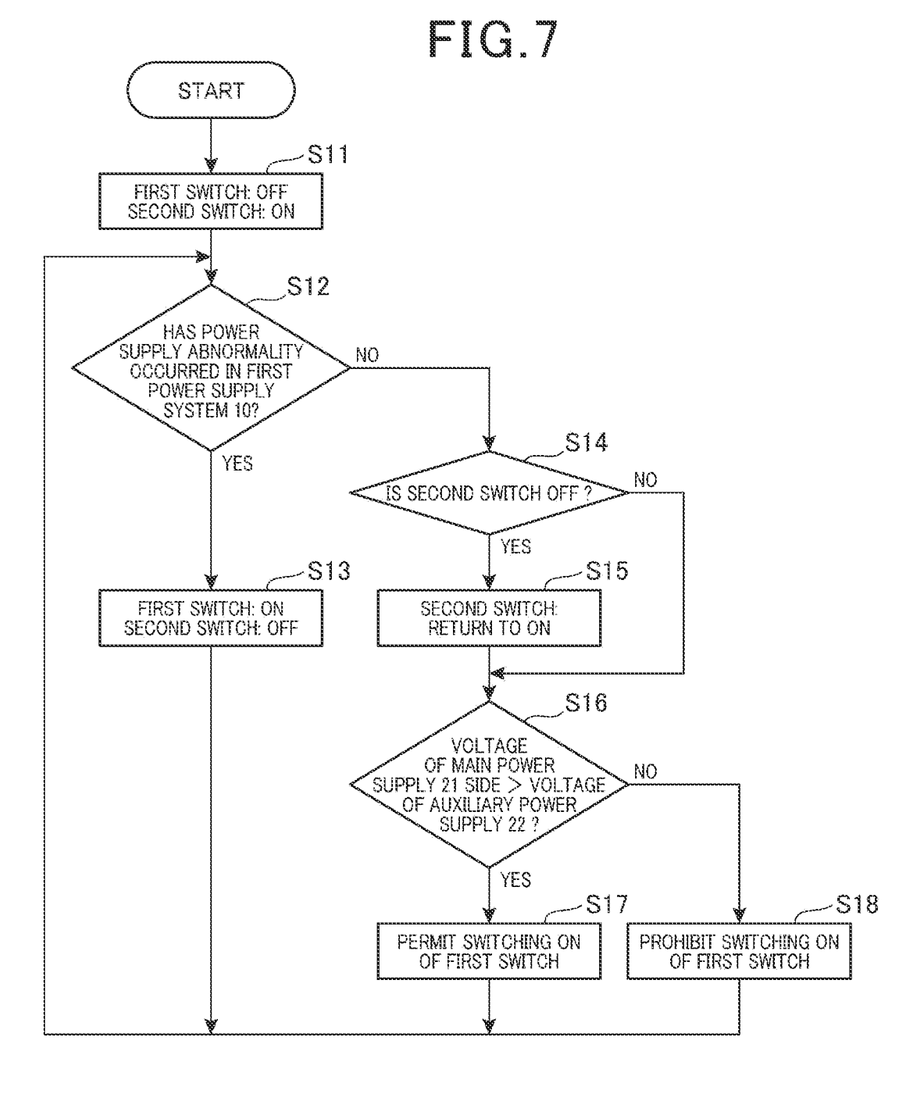
FIG. 7 is a diagram illustrating an example of a flowchart including control of a second switch.

FIG. 7 is a diagram illustrating an example of a flowchart including the control of the second switch 40. As a premise, in a case where no abnormality occurs in the first power supply system 10, the control device 50 controls the first switch 30 to be turned off and controls the second switch 40 to be turned on (step S11).

The control device 50 determines, based on detection results of the power detection unit 7B or the like, whether a power supply abnormality occurs in the first power supply system 10 (step S12). In a case where a power supply abnormality occurs in the first power supply system 10 (step S12; YES), the control device 50 controls the second switch 40 to be turned off, and controls the first switch 30 to be turned on regardless of whether the vehicle 2 is in an automatic driving state (step S13).

Since the second switch 40 is controlled to be turned off, the second load 21 and the auxiliary power supply 22 can be disconnected from the first power supply system 10 in which an abnormality occurs. In addition, since the first switch 30 is controlled to be turned on, power can be supplied to the second load 21 by the auxiliary power supply 22, and a driver can perform driving for stopping the vehicle 2 by the second load 21.

On the other hand, in a case where a power supply abnormality does not occur in the first power supply system 10 or in a case where a power supply abnormality is resolved (step S12; NO), if the second switch 40 is turned off (step S14; YES), the control device 50 returns the second switch 40 to on (step S15). After returning the second switch 40 to on, the control device 50 determines whether a voltage of the second connection line L2 acting from a main power supply 11 side (for example, the voltage acting at the point P1) exceeds the voltage V3 of the auxiliary power supply 22 (step S16).

In a case where the voltage of the second connection line L2 acting from the main power supply 11 side exceeds the voltage V3 of the auxiliary power supply 22 (step S16; YES), the control device 50 permits switching of the first switch 30 to on (step S17), and the processing proceeds to step S12. Consequently, the first switch 30 can be controlled as illustrated in FIGS. 2 to 5 while a decrease in the charge amount of the auxiliary power supply 22 is suppressed.

On the other hand, in a case where the voltage of the second connection line L2 acting from the main power supply 11 side does not exceed the voltage V3 of the auxiliary power supply 22 (step S16; NO), the control device 50 prohibits switching of the first switch 30 to on (step S18), and the processing proceeds to step S12. As a result, since the voltage of the second connection line L2 does not exceed the voltage V3 of the auxiliary power supply 22, the first power supply system 10 (the first power supply 11 and the second power supply 12) is preferentially used, and it is possible to avoid a situation in which the charge amount of the auxiliary power supply 22 decreases.

In this way, in a case where a power supply abnormality does not occur in the first power supply system 10 and the voltage of the second connection line L2 acting from the main power supply 11 exceeds the voltage of the auxiliary power supply 22 in step S16, the first switch 30 is controlled according to the state of the vehicle 2.

Therefore, if the ignition is on (IG-ON) and the first switch 30 is in a predetermined automatic driving state in which the first switch 30 is assigned to be on in FIGS. 2 to 5, the first switch 30 is controlled to be turned on, so that traveling or stopping by using the auxiliary power supply in the predetermined automatic driving state becomes possible.

On the other hand, at a timing of step S17, if the first switch 30 is in a predetermined state in which the first switch 30 is assigned to be off in FIGS. 2 to 5, that is, in a case where the ignition is off, or in a case where the first switch 30 is in a driving state in which the first switch 30 is assigned to off even in a case where the ignition is on, the first switch 30 is controlled to be turned off. As a result, a decrease in the charge amount of the auxiliary power supply 22 can be suppressed. The above is an operation example including the control of the second switch 40.

After the processing of step S18, the control device 50 may control the second power supply 12 to perform voltage control of outputting a voltage higher than the voltage V1 of the main power supply 11 and a voltage at which a voltage of the connection line L2 from the main power supply 11 side to the second load 21 exceeds the voltage V3 of the auxiliary power supply 22. In this case, the control device 50 controls at least either one of a DC-DC converter and a generator (including an inverter) to set the voltage of the second connection line L2 to a voltage higher than the voltage V1 of the main power supply 11 and to a predetermined voltage higher than the voltage V3 of the auxiliary power supply 22.

If it can be confirmed that the voltage of the second connection line L2 exceeds the voltage V3 of the auxiliary power supply 22, the determination in step S16 described above is an affirmative result, and the control device 50 permits the switching of the first switch 30 to on.

Accordingly, even in a case where the voltage of the second connection line L2 does not exceed the voltage V3 of the auxiliary power supply 22 and thus the switching of the first switch 30 to on is prohibited, the first switch 30 can be switched to on to bring the vehicle 2 into a predetermined automatic driving state (a driving state in which the first switch 30 is assigned to be on in FIGS. 2 to 5) among the automatic driving states including partial and conditional automatic driving.

As described above, the control device 50 has a function of acquiring the state of the vehicle 2, controls the first switch 30 to be in the disconnected state in a case where the vehicle 2 is in a predetermined state including ignition off (state in which the first switch 30 is assigned to be off in FIGS. 2 to 5), and controls the first switch 30 to be in the connected state in a case where the vehicle 2 is in a predetermined automatic driving state among the automatic driving states including partial and conditional automatic driving (driving state in which the first switch 30 is assigned to be on in FIGS. 2 to 5).

As a result, it is possible to suppress a decrease in the charge amount of the auxiliary power supply 22 due to an influence of dark current or the like at a time of ignition off while enabling traveling or stopping by using the auxiliary power supply 22 in a predetermined automatic driving state, and it is easier to achieve both the capacity reduction and the improvement in life of the auxiliary power supply 22.

As illustrated in FIGS. 3 and 5, a predetermined automatic driving state includes, among partial and conditional automatic driving, a state of the hands-off automatic driving mode in which the hands-off driving is allowed. Therefore, it is easier to achieve both the capacity reduction and the improvement in life of the auxiliary power supply 22 while enabling traveling or stopping by using the auxiliary power supply 22 in the hands-off automatic driving mode.

In addition, the control device 50 has a function of detecting whether hands of a driver of the vehicle 2 are off the handle. In the case of predetermined automatic driving (automatic driving and hands-off automatic driving illustrated in FIGS. 4 and 5) among partial and conditional automatic driving, the control device controls the first switch 30 to be in the connected state when the hands of the driver are off the handle, and controls the first switch 30 to be in the disconnected state when the hands of the driver are not off the handle. As a result, it is possible to suppress a decrease in the amount of charge of the auxiliary power supply 22 in other states while enabling traveling or stopping by using the auxiliary power supply 22 when hands of a driver are off the handle.

In addition, the control device 50 can more easily detect whether a driver is in the hands-off state by adopting a configuration that specifies whether hands of a driver are off a handle based on a detection result of a contact sensor that detects the contact of hands with the handle of the vehicle 2.

In addition, the control device 50 can easily detect whether a driver is in the hands-off state by adopting a configuration that specifies whether hands of a driver are off a handle based on a detection result of a reaction force sensor that detects a reaction force to the handle of the vehicle 2.

In addition, the control device 50 can easily detect whether a driver is in the hands-off state by adopting a configuration that specifies whether hands of a driver are off a handle based on an image capturing result of a camera (image capturing unit) that captures a driver of the vehicle 2.

In addition, a second switch 40 disposed between the main power supply 11 and the auxiliary power supply 22 is provided, and the main power supply 11 is connected to the second power supply 12 capable of outputting a voltage higher than the voltage of the main power supply 11. In addition, the auxiliary power supply 22 is connected to the second power supply 12 via the second switch 40. Under this configuration, in a case where an abnormality occurs on the main power supply 11 side rather than the second switch 40, the control device 50 controls the second switch 40 to be in the disconnected state, and controls the first switch 30 to be in the connected state regardless of whether the vehicle 2 is in an automatic driving state.

According to this configuration, in a case where no abnormality occurs in the main power supply 11 side, power is supplied to each of the loads 13 and 21 of the vehicle 2 by preferentially using the second power supply 12, and a decrease in the charge amount of the auxiliary power supply 22 can be suppressed. In addition, in a case where an abnormality occurs on the main power supply 11 side, it is possible to enable travelling or stopping by using the auxiliary power supply 22 without being affected by the main power supply 11 and a second power supply 12 side.

Further, the control device 50 permits switching of the first switch 30 to a connected state in a case where no abnormality occurs on the main power supply 11 side rather than the second switch 40 and the voltage of the connection line L2 from the main power supply 11 side to the second load 21 exceeds the voltage V3 of the auxiliary power supply 22, and prohibits the switching of the first switch 30 to the connected state in a case where the voltage of the connection line L2 from the main power supply 11 side to the second load 21 does not exceed the voltage V3 of the auxiliary power supply 22.

As a result, since the voltage of the second connection line L2 does not exceed the voltage V3 of the auxiliary power supply 22, the first power supply system 10 (the first power supply 11 and the second power supply 12) is preferentially used, and it is possible to avoid a situation in which the charge amount of the auxiliary power supply 22 decreases.

In addition, in a case where the vehicle 2 is in a predetermined automatic driving state among the automatic driving states including partial and conditional automatic driving, the control device 50 controls the second power supply 12 so that the voltage of the connection line L2 from the main power supply 11 side including at least the main power supply 11 and the second power supply 12 to the second load 21 exceeds the voltage V3 of the auxiliary power supply 22. More specifically, the control device 50 controls the second switch 40 to be in the connected state in a case where no abnormality occurs on the main power supply 11 side rather than the second switch 40. Further, the control device 50 controls the second power supply 12 to output a voltage which is higher than the voltage V1 of the main power supply 11 and at which the voltage of the connection line L2 from the main power supply 11 side to the second load 21 exceeds the voltage V3 of the auxiliary power supply 22 in a case where the vehicle 2 is in a predetermined automatic driving state among the automatic driving states including partial and conditional automatic driving and where the voltage of the connection line L2 from the main power supply 11 side to the second load 21 does not exceed the voltage V3 of the auxiliary power supply 22.

As a result, even in a case where the voltage of the second connection line L2 does not exceed the voltage V3 of the auxiliary power supply 22 and thus the switching of the first switch 30 to on is prohibited, the first switch 30 can be switched to on to bring the vehicle 2 into a predetermined automatic driving state including partial and conditional automatic driving.

The present invention is not limited to the configuration of the above embodiment, and can be practiced in various embodiments without departing from the gist thereof.

For example, in the above embodiment, the case where both the first load 13 and the second load 21 include a load having the function related to at least either one of traveling and stopping of the vehicle 2 has been described as an example, but the present invention is not limited thereto. For example, the second load 21 may aggregate loads having the function related to at least either one of traveling and stopping of the vehicle 2.

Although the case where the present invention is applied to the vehicle power supply device 1 and the control method thereof illustrated in FIG. 1 and the like has been described, the present invention is not limited thereto. In addition, the vehicle 2 may be a vehicle having a function of performing "advanced automation" at level 4 or higher, "complete automation", and the like.

REFERENCE SIGNS LIST 1 vehicle power supply device
2 vehicle
5 detection group
6 off-vehicle detection unit
7 in-vehicle detection unit
7A hands-off detection unit
7B power detection unit
10 first power supply system
11 main power supply (first power supply)
12 second power supply
13 first load
20 second power supply system
21 second load
22 auxiliary power supply (third power supply)
30 first switch
40 second switch
50 control device
51 first ECU
52 second ECU
53 power supply system control ECU
L1 first connection line
L2 second connection line
L11, L12 connection line

What is claimed is:

1. A vehicle power supply device comprising:
a main power supply;
a first load that is connected to the main power supply;
a second load that is connected in parallel with the first load, is connected to the main power supply, and has a function related to at least either one of traveling and stopping of a vehicle; and
an auxiliary power supply that is connected to the second load and is connected in parallel with the main power supply, wherein
the vehicle power supply device further comprises:
a first switch that is disposed between the auxiliary power supply and the second load; and
a control device that includes a processor and that controls the first switch, wherein
automatic driving of the vehicle includes a hands-on automatic driving mode in which automatic driving is performed in a state where an occupant of the vehicle holds a handle and a hands-off automatic driving mode in which driving is allowed in a state where hands of the occupant are off the handle and which is executed at a designated speed range and on an automobile exclusive road,
the control device has a function of acquiring a state of the vehicle, controls the first switch to be in a disconnected state in a case where the vehicle is in a predetermined state including ignition off,
the control device has a function of detecting whether the hands of the occupant of the vehicle are off the handle of the vehicle, and
the control device
controls the first switch to be in a connected state when the hands-off automatic driving mode is set and when the hands of the occupant are off the handle,
controls the first switch to be in the disconnected state when the hands-off automatic driving mode is set and when the hands of the occupant are not off the handle, and
controls the first switch to be in the disconnected state when the hands-on automatic driving mode is set.

2. The vehicle power supply device according to claim 1, wherein
the control device specifies, based on a detection result of a contact sensor that detects contact of hands with the handle of the vehicle, whether the hands of the occupant are off the handle.

3. The vehicle power supply device according to claim 1, wherein
the control device specifies, based on a detection result of a reaction force sensor that detects a reaction force to the handle of the vehicle, whether the hands of the occupant are off the handle.

4. The vehicle power supply device according to claim 1, wherein
the control device specifies, based on an image capturing result of an image capturing unit that captures the occupant of the vehicle, whether the hands of the occupant are off the handle.

5. The vehicle power supply device according to claim 1, wherein
the main power supply is connected to a second power supply capable of outputting a voltage higher than a voltage of the main power supply,
the auxiliary power supply is connected to the second power supply via a connection line from the main power supply to the second load, and
in a case where the vehicle is in a second predetermined automatic driving state among automatic driving states including partial and conditional automatic driving, the control device controls the second power supply such that a voltage of a connection line from a main power supply side including at least the main power supply and the second power supply to the second load exceeds a voltage of the auxiliary power supply.

6. The vehicle power supply device according to claim 1, further comprising
a second switch that is disposed between the main power supply and the auxiliary power supply, wherein
the main power supply is connected to a second power supply capable of outputting a voltage higher than a voltage of the main power supply,
the auxiliary power supply is connected to the second power supply via the second switch, and
in a case where an abnormality occurs on a main power supply side rather than the second switch, the control device controls the second switch to be in a disconnected state and controls the first switch to be in a connected state regardless of whether the vehicle is in an automatic driving state.

7. The vehicle power supply device according to claim 6, wherein in a case where no abnormality occurs on the main power supply side rather than the second switch, the control device permits switching of the first switch to a connected state in a case where a voltage of a connection line from the main power supply side to the second load exceeds a voltage of the auxiliary power supply, and prohibits the switching of the first switch to the connected state in a case where the voltage of the connection line from the main power supply side to the second load does not exceed the voltage of the auxiliary power supply.

8. A method for controlling a vehicle power supply device including:
- a main power supply;
- a first load that is connected to the main power supply;
- a second load that is connected in parallel with the first load, is connected to the main power supply, and has a function related to at least either one of traveling and stopping of a vehicle; and
- an auxiliary power supply that is connected to the second load and is connected in parallel with the main power supply,
- automatic driving, of the vehicle, including: a hands-on automatic driving mode in which automatic driving is performed in a state where an occupant of the vehicle holds a handle; and a hands-off automatic driving mode in which driving is allowed in a state where hands of the occupant are off the handle and which is executed at a designated speed range and on an automobile exclusive road, the method comprising:

acquiring a state of the vehicle;

controlling a first switch disposed between the auxiliary power supply and the second load to be in a disconnected state in a case where the vehicle is in a predetermined state including ignition off;

detecting whether the hands of the occupant of the vehicle are off the handle of the vehicle;

controlling the first switch to be in a connected state when the hands-off automatic driving mode is set and when the hands of the occupant are off the handle;

controlling the first switch to be in the disconnected state when the hands-off automatic driving mode is set and when the hands of the occupant are not off the handle, and controlling the first switch to be in the disconnected state when the hands-on automatic driving mode is set.

* * * * *